United States Patent [19]

Nishizawa et al.

[11] Patent Number: 5,213,077
[45] Date of Patent: May 25, 1993

[54] GAIN ADJUSTING DEVICE FOR PID CONTROLLER FOR CONTROLLING ROTATIONAL SPEED OF INTERNAL COMBUSTION ENGINE

[75] Inventors: Hiroyuki Nishizawa; Masataka Osawa; Kohta Ohtoshi; Tomohiro Iwai, all of Aichi, Japan

[73] Assignees: Kabushiki Kaisha Toyota Chuo Kenkyusho, Aichi; Kabushiki Kaisha Toyoda Jidoshokki Seisakusho, Kariya, both of Japan

[21] Appl. No.: 883,536

[22] Filed: May 15, 1992

[30] Foreign Application Priority Data

May 15, 1991 [JP] Japan .................. 3-110606

[51] Int. Cl.$^5$ .............. F02D 31/00; F02D 41/00
[52] U.S. Cl. .................. 123/352; 123/361; 123/339
[58] Field of Search ............ 123/352, 361, 339

[56] References Cited

U.S. PATENT DOCUMENTS

| | | | |
|---|---|---|---|
| 4,471,735 | 9/1984 | Collonia | 123/352 |
| 4,513,711 | 4/1985 | Braun et al. | 123/352 |
| 4,538,571 | 9/1985 | Buck et al. | 123/352 |
| 4,572,125 | 2/1986 | Kratt | 123/339 |
| 4,572,127 | 2/1986 | Morris | 123/339 |
| 4,603,668 | 8/1986 | Ueno | 123/352 |
| 4,616,613 | 10/1986 | Collonia | 123/339 |
| 4,671,235 | 6/1987 | Hosaka | 123/352 |
| 4,771,749 | 9/1988 | Kiuchi et al. | 123/352 |
| 4,791,900 | 12/1988 | Buck et al. | 123/352 |
| 4,834,045 | 5/1989 | Imai et al. | 123/352 |

FOREIGN PATENT DOCUMENTS 62-241006 10/1987 Japan .
1-258003 10/1989 Japan .

Primary Examiner—E. Rollins Cross
Assistant Examiner—Thomas Moulis
Attorney, Agent, or Firm—Oblon, Spivak, McClelland, Maier & Neustadt

[57] ABSTRACT

A plurality of characteristic variables concerning the rotational speed are detected so as to be used for inference, and the plurality of characteristic variables are divided into a plurality of sets. Groups of rules each indicating the relationship between the characteristic variable corresponding to each set and an amount of gain adjustment, as well as the relationship between the magnitude of the characteristic variable corresponding to each set and the degree of adoption of the amount of gain adjustment, are stored. When it is determined that each of the characteristic variables cannot be controlled within a permissible range, the relationship between each of the characteristic variables of the groups of rules and the amount of gain adjustment is corrected in such a manner that the permissible range is broadened. The amount of gain adjustment for each set is inferred on the basis of the characteristic variable detected and each group of rules, and the degree of adoption of the amount of gain adjustment is determined for each of the sets in correspondence of the manipulated variable of the respective characteristic variables. On the basis of the result of inference of the amount of gain adjustment and the degree of adoption, an amount of gain to be adjusted is determined by calculating a weighted average value of the result of inference of the amount of gain adjustment with the degree of adoption set as weight. This amount of gain to be adjusted is set in a PID controller.

13 Claims, 14 Drawing Sheets

FIG. 16

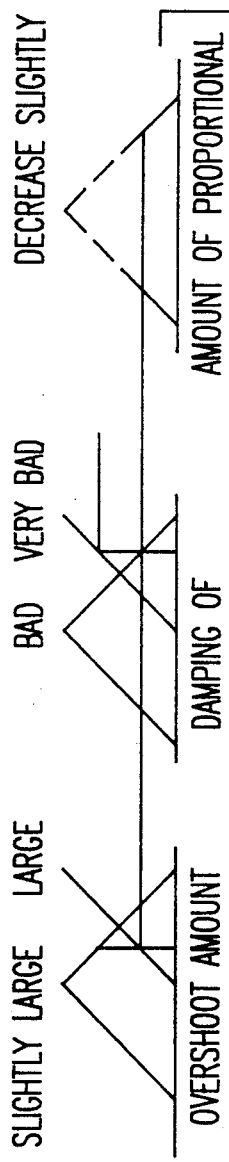
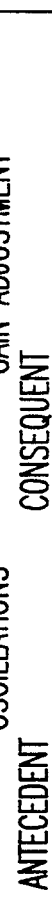
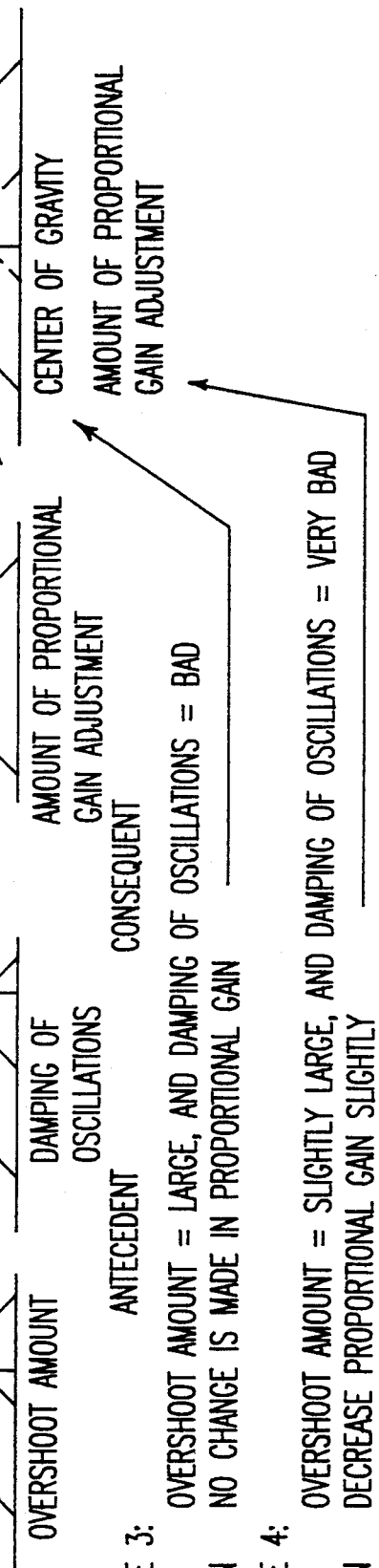

RULE 1:
IF   OVERSHOOT AMOUNT = LARGE, AND DAMPING OF OSCILLATIONS = VERY BAD
THEN DECREASE PROPORTIONAL GAIN SLIGHTLY

RULE 2:
IF   OVERSHOOT AMOUNT = SLIGHTLY LARGE, AND DAMPING OF OSCILLATIONS = BAD
THEN NO CHANGE IS MADE IN PROPORTIONAL GAIN

RULE 3:
IF   OVERSHOOT AMOUNT = LARGE, AND DAMPING OF OSCILLATIONS = BAD
THEN NO CHANGE IS MADE IN PROPORTIONAL GAIN

RULE 4:
IF   OVERSHOOT AMOUNT = SLIGHTLY LARGE, AND DAMPING OF OSCILLATIONS = VERY BAD
THEN DECREASE PROPORTIONAL GAIN SLIGHTLY

GAIN ADJUSTING DEVICE FOR PID CONTROLLER FOR CONTROLLING ROTATIONAL SPEED OF INTERNAL COMBUSTION ENGINE

BACKGROUND OF THE INVENTION

1. Field of the Invention

The present invention relates to a gain adjusting device for a PID controller for controlling the rotational speed of an internal combustion engine, for setting a gain with respect to the PID controller for controlling the rotational speed of the internal combustion engine.

2. Description of the Related Art

In a PID controller which is a type of feedback controller, a PID controller is known in which an amount of gain adjustment is set by making use of fuzzy inference so as to effect gain adjustment automatically (refer to Japanese Patent Application Laid-Open Nos. 241006/1987 and 258003/1989, for example). In these PID controllers making use of fuzzy inference, a rule base consisting of a multiplicity of rules stating the human knowhow for gain adjustment is stored in advance.

A plurality of characteristic variables for evaluating the controlled state are set in an object to be controlled by the PID controller. The multiplicity of rules are prepared by using the knowhow employed by human beings in gain adjustment. Specifically, the rules are stated in the form of compound propositions of an IF-THEN format in which all the characteristic variables to be evaluated are connected together. For instance, in a case where a settling time, an amount of overshoot, and the damping of oscillations are set as the characteristic variables, the following compound proposition is used: "If the setting time =slow, overshoot amount =large, and the damping of oscillations =bad, then increase the value of proportional (P) gain, increase the value of integral (I) gain, and increase the value of differential (D) gain." In addition, the PID controller stores in the form of membership functions antecedents for determining the goodness of fit with respect to the respective rules by evaluating the detected characteristic variables, as illustrated in FIGS. 14A to 14D. In addition, the PID controller stores in the form of membership functions consequents for weighting the amounts of gain adjustment indicated by the respective rules in correspondence with the goodness of fit concerning the respective rules, as illustrated in FIGS. 15A to 15C.

When amounts of gain adjustment are actually set by making use of fuzzy inference, the plurality of characteristic variables are detected, and the goodness of fit concerning the respective rules on the detected characteristic variables is determined by using the membership functions of the antecedents, as shown in FIG. 16. Then, in the membership functions of the consequents, graphic forms, in which apex portions of the triangles corresponding to the amounts of gain adjustment indicated by the rules are cut off by the goodness of fit concerning the respective rules, are obtained for each rule. The graphic forms obtained for the respective rules are superposed one on top of another, and the center of gravity is determined, so as to set an amount of gain adjustment. This processing corresponds to processing for calculating an average value by weighting the amounts of gain adjustment indicated by the rules in correspondence with the goodness of fit of the rules.

The amount of gain adjustment set in the above-described processing reflects the knowhow used by human beings in gain adjustment, it is possible to effect appropriate gain adjustment in agreement with the human thinking in comparison with the PID gain adjusting device which does not adopt fuzzy inference.

However, the setting of the amount of gain adjustment in the above-described PID controller is effected by using the rule base stating the rules in the form of compound propositions in which all the characteristic variables for evaluation are connected together, as described above. Therefore, if it is assumed that the number of divisions of evaluation in the antecedent (i.e., the number of items of evaluation, such as "slightly large" and "small," with respect to a single characteristic variable) is m, and the number of characteristic variables to be evaluated is n, then since there are m divisions for each characteristic variable, the number of combinations of the rules reaches a gigantic number of m raised to the n th power. For instance, in a case where the number of divisions is 4, and the number of characteristic variables is 5, the number of combinations of the rules becomes 1000 or more.

If an attempt is made to increase the number of requirements respect to the controlled state, it is necessary to evaluate the controlled state by increasing the numbers of divisions and characteristic variables. However, if the numbers of divisions and characteristic variables are increased as mentioned above, according to the method of setting the amount of gain adjustment described above, the number of combinations of the rules reaches an enormous number, thereby rendering the structuring per se of the rules difficult. For this reason, it has been impossible to apply the PID gain adjusting device using a conventional fuzzy inference method to control of the rotational speed of an internal combustion engine for which a multiplicity of items of evaluation need to be set.

In addition, in the internal combustion engines, the rotation becomes unstable particularly in a low rotational speed range in which an output shaft rotates at a relatively low speed, and it becomes impossible to control each of the characteristic variables within a permissible range. However, if an attempt is made to control the rotational speed of the internal combustion engine according to the conventional method of setting the amount of gain adjustment, the gain is changed toward a high-gain side in an attempt to control fluctuations in rotational speed in the low rotational speed range, which increases the magnitude of the oscillations to the contrary, and an attempt is subsequently made to control these oscillations by lowering the gain. This disadvantageously creates a situation in which the gain cannot be made to converge.

SUMMARY OF THE INVENTION

In view of the above-described circumstances, it is an object of the present invention to provide a gain adjusting device for a PID controller for controlling the rotational speed of an internal combustion engine, which is capable of effecting proper gain adjustment in agreement with the human thinking, and of effecting appropriate control with respect to the internal combustion engine for which a multiplicity of items of evaluation need to be set.

To this end, in accordance with the present invention, there is provided a gain adjusting device for a PID controller for controlling the rotational speed of an internal combustion engine, so as to adjust a gain of the PID controller in such a manner that the rotational speed agrees with a set point on the basis of a deviation of the rotational speed from a set point and a gain, comprising: characteristic variable detecting means for detecting a plurality of characteristic variables concerning the rotational speed used for inference; first storage means which stores groups of rules each indicating the relationship between the characteristic variable corresponding to a respective one of a plurality of sets which are divided from the plurality of characteristic variables and an amount of gain adjustment; second storage means which stores the relationship between a magnitude of the characteristic variable corresponding to each of the sets and a degree of adoption of the amount of gain adjustment; correcting means for correcting the relationship between each of the characteristic variables of the groups of rules and the amount of gain adjustment in such a manner that a permissible range broadened when it is determined that each of the characteristic variables cannot be controlled within the permissible range; and inferring means for inferring the amount of gain adjustment for each of the sets on the basis of the characteristic variables detected and the groups of rules, for determining the degree of adoption of the amount of gain adjustment for each of the sets in correspondence with the manipulated variable of the respective characteristic variables, and for determining on the basis of the result of inference of the amount of gain adjustment and the degree of adoption an amount of gain to be adjusted by calculating a weighted average value of the result of inference of the amount of gain adjustment with the degree of adoption set as weight.

In the present invention, the groups of rules are arranged in such a manner that, if the plurality of characteristic variables are divided into a plurality of sets, the groups of rules respectively indicate the relationship between the characteristic variable corresponding to a respective one of the sets and an amount of gain adjustment. For instance, in a case where the number of divisions is 4 and the number of the characteristic variables is 4, according to the prior art, each rule consists of a compound proposition in which the four characteristic variables are connected together, and the number of rules becomes $4^4 = 256$. However, if the groups of rules are arranged by dividing the four characteristic variables into, for instance, two sets in accordance with the present invention, each rule consists of a compound proposition in which two characteristic variables are connected together, so that the number of rules can be $4^2 + 4^2 = 32$. Furthermore, if the groups of rules are arranged by being divided into four sets, i.e., if the number of sets is made to equal the number of characteristic variables, each rule becomes a single proposition, and the number of rules becomes $4 \times 4 = 16$. Accordingly, since the number of rules can be reduced, the structuring and adjustment of the groups of rules are facilitated, and if the gain adjusting device is applied particularly to an object to be controlled for which a multiplicity of items of evaluation need to be set, the number of rules can be reduced substantially as compared with the prior art method, thereby facilitating the structuring and adjustment of a rule base. Thus, the present invention can be easily applied particularly to a PID controller for controlling the rotational speed of an internal combustion engine for which a multiplicity of items of evaluation need to be set.

In addition, since the groups of rules in the rule base can be prepared by using the knowhow employed by human beings in gain adjustment, the amount of gain adjustment set by the gain adjusting device for a PID controller for controlling the rotational speed of an internal combustion engine can be made to reflect the human knowhow. Hence, it is possible to effect appropriate gain adjustment in agreement with the human thinking.

In addition, the arrangement provided is such that the relationship between the magnitude of the characteristic variable for each set and the degree of adoption of the amount of gain adjustment is stored; the degree of adoption of the amount of gain adjustment is determined for each of the sets in correspondence with the manipulated variable of the respective characteristic variables; and on the basis of the result of inference of the amount of gain adjustment and the degree of adoption, an amount of gain to be adjusted is determined by calculating a weighted average value of the result of inference of the amount of gain adjustment with the degree of adoption set as weight. Accordingly, it is possible to change the degree of importance of the result of each inference by means of the degree of adoption. This corresponds to the fact that when adjustment is made by a human being, particular attention is paid to items of evaluation which do not satisfy their requirements, and less attention is paid to the items of evaluation which satisfy their requirements. Accordingly, it is possible to effect appropriate gain adjustment in agreement with the human thinking as the characteristic variables are divided into sets in correspondence with the items of evaluation, and the degree of adoption is changed in response to a change in the characteristic variable in such a manner that the degree of importance, i.e., the degree of adoption, of the results of inference of the set corresponding to a specific item of evaluation becomes high when the requirements of that item of evaluation are not satisfied.

In addition, the relationship between each of the characteristic variables of the groups of rules and the amount of gain adjustment is corrected by the correcting means in such a manner that a permissible range is broadened when it is determined that each of the characteristic variables cannot be controlled within the permissible range. Since this correction is made, even if, for instance, the fluctuations in engine speed in a low rotational speed range, which cannot be eliminated, are detected, the groups of rules are corrected to broaden the permissible range, so as to allow the fluctuations. Consequently, the gain is changed to control the fluctuations in the engine speed, and the gain is set appropriately. Accordingly, it is possible to effect appropriate control with respect to the internal combustion engine in which a characteristic variable which cannot be controlled within a permissible range exists.

It should be noted that the number of aforementioned sets suffices if it is plural. However, if it is assumed that the number of divisions of evaluation is m and the number of characteristic variables corresponding to the respective sets is p, the number of rules for each set becomes $m^p$. For this reason, to facilitate the structuring and adjustment of the groups of rules by reducing the number of rules, it is preferable to divide the plurality of characteristic variables into as great a number of sets as possible. In particular, in a case where the number of characteristic variables and the number of sets are made identical, the rules in the groups of rules become single propositions, as described above, so that the inference by the inferring means is facilitated.

The inferring means in accordance with the present invention may set the amount of gain adjustment set, directly in the PID controller. Alternatively, the inferring means may set a post-adjustment gain, which is determined from the amount of gain adjustment set and a present gain, in the PID controller. In the case where the amount of gain adjustment is set in the PID controller, the PID controller adjusts the present gain on the basis of the amount of gain adjustment, and controls the rotational speed on the basis of a deviation of the adjusted gain from the rotational speed. Meanwhile, in the case where the post-adjustment gain is set in the PID controller, the PID controller controls the rotational speed on the basis of the deviation of the set gain from the rotational speed.

As described above, in accordance with the present invention, the relationship between the amount of gain adjustment to be controlled on the one hand, and the characteristic variable corresponding to each set when the plurality of characteristic variables are divided into the plurality of sets by the groups of rules on the other hand, is expressed. In addition, the relationship between each of the characteristic variables and the amount of gain adjustment is corrected in such a manner as to broaden a permissible range when it is determined that the relevant characteristic variable cannot be controlled within that permissible range. Hence, it is possible to obtain outstanding advantages in that it is possible to effect appropriate gain adjustment in agreement with the human thinking, and that appropriate control can be effected with respect to an object to be controlled such as an internal combustion engine for which a multiplicity of items of evaluation need to be set.

The other objects, features and advantages of the present invention will become more apparent from the following detailed description of the invention when read in conjunction with the accompanying drawings.

BRIEF DESCRIPTION OF THE DRAWINGS

FIG. 16 is a diagram illustrating the calculating processing of an amount of proportional gain adjustment, by way of explaining the operation of the conventional PID controller in which fuzzy inference is adopted.

DESCRIPTION OF THE PREFERRED EMBODIMENT

Figure 1:
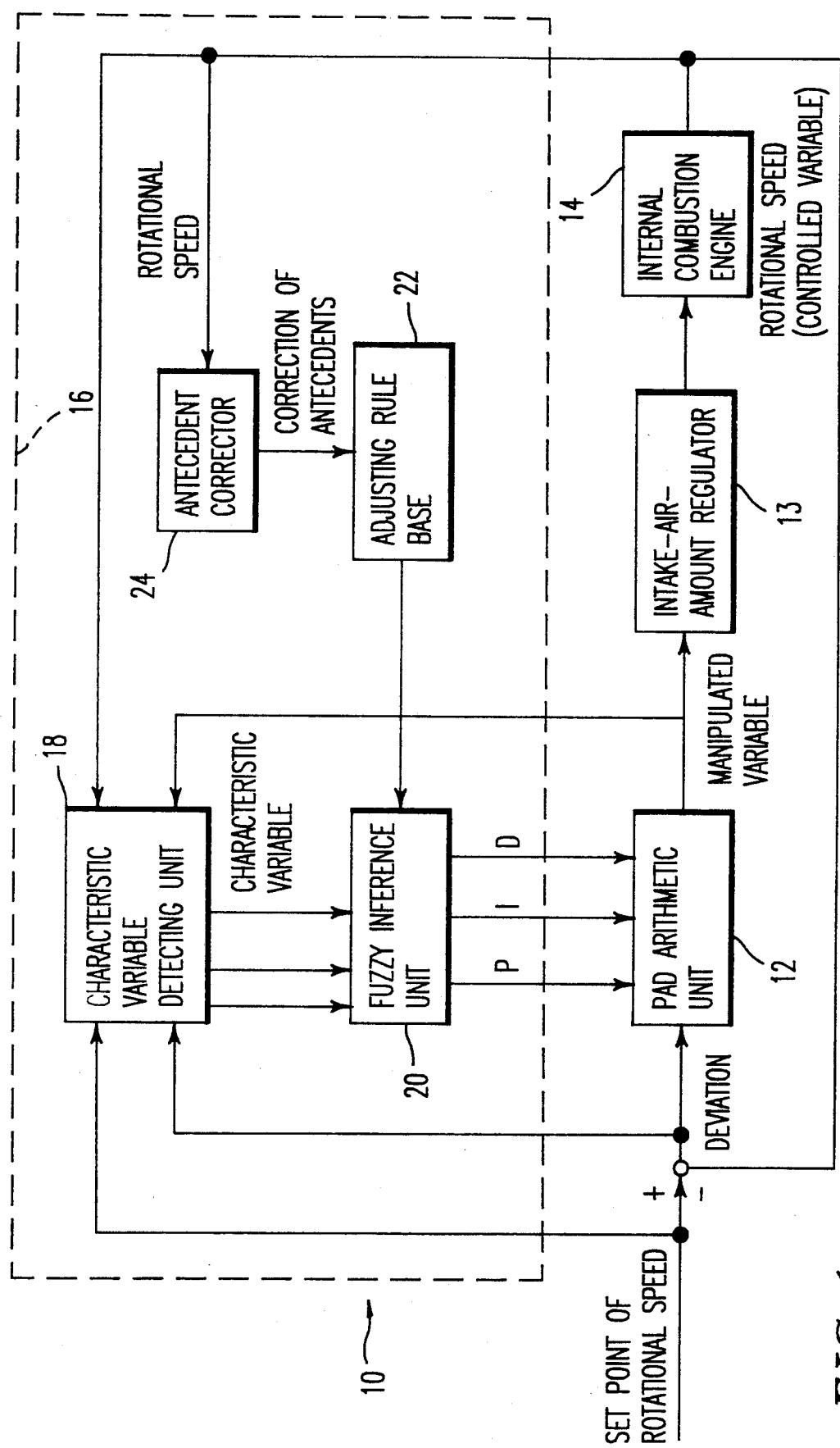
FIG. 1 is a schematic diagram of a PID controller with a gain adjusting device including an auto-tuning section in accordance with a first embodiment.

Referring now to the accompanying drawings, a description will be given of a first embodiment of the present invention. FIG. 1 shows a PID controller 10 with a gain adjusting device in accordance with the first embodiment of the present invention.

The PID controller 10 with a gain adjusting device controls the rotational speed of an internal combustion engine 14 which is an object to be controlled. The PID controller 10 with a gain adjusting device has a PID arithmetic unit 12. The PID arithmetic unit 12 is connected to the internal combustion engine 14 via an intake-air-amount regulator 13. The PID arithmetic unit 12 provides the intake-air-amount regulator 13 with a predetermined manipulated variable consisting of a proportional (P) gain, an integral (I) gain, and a differential (D) gain. The intake-air-amount regulator 13 has an unillustrated damper disposed in an intake pipe of the internal combustion engine 14, and regulates the amount of intake air into the internal combustion engine 14 by moving the damper in correspondence with the manipulated variable imparted thereto. The result of regulation of the amount of intake air appears in the form of a rotational speed as a controlled variable. A deviation of the rotational speed from a desired value (set point) of rotational speed is inputted to the PID arithmetic unit 12, and the PID arithmetic unit 12 performs known PID control for changing the manipulated variable in correspondence with the inputted deviation. In addition, an auto-tuning section 16 corresponding to the gain adjusting device in accordance with the present invention is connected to the PID arithmetic unit 12. Amounts of gain adjustment for P, I, and D from the auto-tuning section are set in the PID arithmetic unit 12, and the P, I, and D gains are adjusted on the basis of the amounts of gain adjustment thus set.

The auto-tuning section 16 is comprised of a microcomputer or the like. If the auto-tuning section 16 is expressed by functional blocks, the auto-tuning section 16 includes a characteristic variable detecting unit 18, a fuzzy inference unit 20, an adjusting rule base 22, and an antecedent corrector 24. The manipulated variable imparted to the internal combustion engine 14 via the intake-air-amount regulator 13, the rotational speed of the internal combustion engine 14, the set point of rotational speed, and the aforementioned deviation are inputted to the characteristic variable detecting unit 18. The characteristic variable detecting unit 18 detects 12 characteristic variables on the basis of the information inputted thereto. The characteristic variables to be detected are "the deviation of a settling time from a designated value," "the amount of overshoot," "the damping of oscillations," "the overshoot converging time," "the change in manipulation during a steady state," "the change in a controlled variable before reaching a set point," "$T_P$(95% response time ÷ 60% response time)," "the change in the controlled variable during the occurrence of a disturbance," "the time required for recovering a change in the controlled variable during the occurrence of a disturbance," "self-excited oscillations," "oscillations in the controlled variable," and "oscillations in the manipulated variable." The fuzzy inference unit 20 is connected to the characteristic variable detecting unit 18, and the characteristic variable detecting unit 18 outputs the characteristic variables it detected to the fuzzy inference unit 20. The adjusting rule base 22, i.e., a storage means, is connected to the fuzzy inference unit 20. The storage means 22 is constituted by, for instance, a nonvolatile memory or the like.

In this embodiment, 11 items of evaluation, which will be described below, are set to evaluate the controlled state of the internal combustion engine 14. The 12 characteristic variables are classified into 11 sets corresponding to these items of evaluation. In this embodiment, groups of rules which indicate the relationship between each of the characteristic variables corresponding to a specific item of evaluation and the amounts of gain adjustment are set in correspondence with the 11 items of evaluation, thereby constituting the aforementioned adjusting rule base. These groups of rules reflect the knowhow which human beings use in the gain adjustment. The items of evaluation and the groups of rules corresponding to the items of evaluation in this embodiment are shown below.

Item 1 of Evaluation: Whether the deviation of the settling time from a designated value is small.

Group 1 of Rules: Gain adjustment is effected in such a manner as to maintain the settling time to the designated value.

If the settling time is sufficiently fast,
then no gain adjustment is effected.
If the settling time is slightly slow,
then the proportional gain is increased by 1%,
the integral gain is increased by 2%, and
the differential gain is increased by 1%.
If the settling time is slow,
then the proportional gain is increased by 35%,
the integral gain is increased by 35%, and
the differential gain is increased by 35%.
If the settling time is very slow,
then the proportional gain is increased by 50%,
the integral gain is increased by 50%, and
1 differential gain is increased by 50%.

Item 2 of Evaluation: Whether the amount of overshoot is small, and the damping of oscillations is good.

Group 2 of Rules: Gain adjustment is effected in such a manner that the amount of overshoot becomes small and the damping of oscillations becomes good. This Item 2 of Evaluation is aimed at stabilizing control, and the characteristic variables concerned are two variables, the "amount of overshoot" and the "damping of oscillations." The makeup of the rules in Group 2 of Rules is shown in Tables 1 to 3 below.

TABLE 1

Map of Rules for Adjusting Proportional Gain in Group 2 of Rules

|  | Oscillation Damping = Good | Slightly bad | bad | very bad |
|---|---|---|---|---|
| Amount of overshoot = sufficiently small | no change (0%) | no change (0%) | no change (0%) | no change (0%) |
| = slightly large | increase slightly (+3%) | no change (0%) | no change (0%) | decrease slightly (−3%) |
| = large | increase (+10%) | increase slightly (+3%) | no change (0%) | decrease slightly (−3%) |
| = very large | increase substantially (+20%) | increase slightly (+3%) | increase slightly (+3%) | no change (0%) |

TABLE 2

Map of Rules for Adjusting Integral Gain in Group 2 of Rules

|  | Oscillation Damping = Good | Slightly bad | bad | very bad |
|---|---|---|---|---|
| Amount of overshoot = sufficiently small | no change (0%) | no change (0%) | no change (0%) | no change (0%) |
| = slightly large | no change (0%) | decrease slightly (−3%) | decrease slightly (−3%) | decrease slightly (−3%) |
| = large | decrease slightly (−3%) | decrease (−6%) | decrease (−6%) | decrease (−6%) |
| = very large | decrease slightly (−3%) | decrease (−6%) | decrease substantially (−12%) | decrease substantially (−12%) |

TABLE 3

Map of Rules for Adjusting Differential Gain in Group 2 of Rules

|  | Oscillation Damping = Good | Slightly bad | bad | very bad |
|---|---|---|---|---|
| Amount of overshoot = | no change (0%) | no change (0%) | no change (0%) | increase slightly |

TABLE 3-continued

Map of Rules for Adjusting Differential Gain in Group 2 of Rules

| | Oscillation Damping = Good | Slightly bad | bad | very bad |
|---|---|---|---|---|
| sufficiently small | | | | (2%) |
| = slightly large | no change (0%) | increase slightly (+2%) | increase (+5%) | increase substantially (+10%) |
| = large | no change (0%) | increase slightly (+2%) | increase (5%) | increase substantially (+10%) |
| = very large | no change (0%) | increase slightly (+2%) | increase (+5%) | increase substantially (+10%) |

Item 3 Of Evaluation: Whether an overshoot converging time $T_0$ is short.

Group 3 of Rules: Even if the amount of overshoot is small, it is undesirable that the deviation to be controlled still remains, so that gain adjustment is effected in such a manner that the overshoot converging time $T_0$ becomes short.

If $T_0$ is sufficiently short,
  then no gain adjustment is effected.
If $T_0$ is slightly long,
  then the differential gain is decreased by 5%.
If $T_0$ is long,
  then the differential gain is decreased by 10%.
If $T_0$ is very long,
  then the differential gain is decreased by 20%.

Item 4 of Evaluation: Whether changes in manipulation during a steady state are small.

Group 4 of Rules: Even when the controlled variable is stable (during the steady state), there are cases where the manipulated variable changes due to noise and the like, so that gain adjustment is effected in such a manner that changes in the manipulated variable during the steady state become small.

If changes in the manipulated variable during the steady state are sufficiently small,
  then no gain adjustment is effected.
If changes in the manipulated variable during the steady state are slightly large,
  then no proportional gain adjustment is effected,
  no integral gain adjustment is effected, and
  the differential gain is decreased by 7%.
If changes in the manipulated variable during the steady state are large,
  then the proportional gain is decreased by 2%,
  the integral gain is decreased by 2%, and
  the differential gain is decreased by 15%.
If changes in the manipulated variable during the steady state are very large,
  then the proportional gain is decreased by 4%,
  the integral gain is decreased by 4%, and
  the differential gain is decreased by 30%.

Item 5 of Evaluation: Whether there is a change in the controlled variable before reaching a set point.

Group 5 of Rules: If the value of the proportional gain is large, there are cases where the controlled variable returns backwards before reaching the set point, so that gain adjustment is effected in such a manner that the controlled variable does not return backwards when this phenomenon has occurred.

If there is no change in the controlled variable before reaching the set point,
  then no gain adjustment is effected.
If the change in the controlled variable before reaching the set point is slightly large,
  then the proportional gain is decreased by 15%.
  the integral gain is increased by 1%, and
  the differential gain is decreased by 3%.
If the change in the controlled variable before reaching the set point is large,
  then the proportional gain is decreased by 30%.
  the integral gain is increased by 2%, and
  the differential gain is decreased by 5%.
If the change in the controlled variable before reaching the set point is very large,
  then the proportional gain is decreased by 40%.
  the integral gain is increased by 5%, and
  the differential gain is decreased by 10%.

Item 6 of Evaluation: Whether TP (95% response time ÷ 60% response time) is small.

Group 6 of Rules: Even if the rise in the controlled variable is fast, there are cases where the change becomes dull immediately before the set point, and the deviation to be controlled still remains indefinitely, so that gain adjustment is effected in such a manner as to overcome this problem.

If $T_p$ is sufficiently small,
  then no gain adjustment is effected.
If $T_p$ is slightly large,
  then the proportional gain is decreased by 30%.
  the integral gain is decreased by 5%, and
  the differential gain is decreased by 30%.
If $T_p$ is large,
  then the proportional gain is decreased by 50%.
  the integral gain is decreased by 10%, and
  the differential gain is decreased by 50%.
If $T_p$ is very large,
  then the proportional gain is decreased by 70%.
  the integral gain is decreased by 20%, and
  the differential gain is decreased by 70%.

Item 7 of Evaluation: Whether a change in the controlled variable during the occurrence of a disturbance is small.

Group 7 of Rules: Gain adjustment is effected in such a manner as to control a change in the controlled variable when a disturbance causing a load change has occurred.

If the change in the controlled variable during the disturbance is sufficiently small,
  then no gain adjustment is effected.
If the change in the controlled variable during the disturbance is slightly large,
  then the proportional gain is increased by 6%,
  the integral gain is increased by 4%, and
  no differential gain is effected.
If the change in the controlled variable during the disturbance is large,
  then the proportional gain is increased by 12%,
  the integral gain is increased by 8%, and
  the differential gain is increased by 2%.
If the change in the controlled variable during the disturbance is very large,
  then the proportional gain is increased by 24%,
  the integral gain is increased by 16%, and
  the differential gain is increased by 4%.

Item 8 of Evaluation: Whether a time $T_r$ required for recovering a change in the controlled variable during the occurrence of a disturbance is short.

Group 8 of Rules: Gain adjustment is effected in such a manner that the time $T_r$ required for recovering a change in the controlled variable during the occurrence of a disturbance, such as a load change, becomes short.

If $T_r$ is sufficiently small,
then no gain adjustment is effected.
If $T_r$ is slightly large,
then the proportional gain is increased by 2%,
the integral gain is increased by 5%, and
the differential gain is deceased by 8%.
If $T_r$ is large,
then the proportional gain is increased by 4%,
the integral gain is increased by 15%, and
no differential gain is effected.
If $T_r$ is very large,
then the proportional gain is increased by 8%,
the integral gain is increased by 30%, and
the differential gain is increased by 5%.

Item 9 of Evaluation: Whether self-excited oscillations are being dampened.

Group 9 of Rules: Since self-excited oscillations can occur due to such as a change in the characteristics of the object to be controlled, gain adjustment is effected in such a manner as to control the oscillations at an initial stage of the self-excited oscillations.

If the oscillations are being dampened,
then no gain adjustment is effected.
If the oscillations are being amplified slightly,
then the proportional gain is decreased by 10%.
If the oscillations are being amplified,
then the proportional gain is decreased by 20%.
If the oscillations are being amplified substantially,
then the proportional gain is decreased by 50%.

Item 10 of Evaluation: Whether oscillations in the controlled variable have been dampened.

Group 10 of Rules: When large oscillations in the controlled variable remain indefinitely, manipulation is effected to reduce the control gains so as to avoid danger.

If the oscillations in the controlled variable have been sufficiently dampened,
then no gain adjustment is effected.
If oscillations of a small amplitude remain in the controlled variable,
then all the gains are decreased by 10%.
If oscillations of a large amplitude remain in the controlled variable,
then all the gains are decreased by 20%.
If oscillations of a very large amplitude remain in the controlled variable,
then all the gains are decreased by 50%.

Item 11 of Evaluation: Whether oscillations in the manipulated variable have been dampened.

Group 11 of Rules: When large oscillations in the manipulated variable remain indefinitely, manipulation is effected to reduce the control gains so as to avoid danger.

If the oscillations in the manipulated variable have been sufficiently dampened,
then no gain adjustment is effected.
If oscillations of a small amplitude remain in the manipulated variable,
then all the gains are decreased by 10%.
If oscillations of a large amplitude in the manipulated variable remain,
then all the gains are decreased by 20%.
If oscillations of a very large amplitude remain in the manipulated variable,
then all the gains are decreased by 50%.

As described above, since in this embodiment the number of divisions of evaluation is "4," and the number of characteristic variables to be detected is "12," the number of combination of rules according to the conventional rule base reaches a gigantic number of $4^{12} = 16,777,216$, so that the structuring and adjustment of the rule base would be practically impossible. In this embodiment, however, the 12 characteristic variables are divided into sets corresponding to the 11 items of evaluation, groups of rules are set for the respective sets, and the rules other than those in Group 2 of Rules are respectively constituted by single propositions. Hence, since the number of rules can be $4 \times 10 + 4^2 = 56$, the structuring and adjustment of the rules can be effected easily.

Figure 2A:
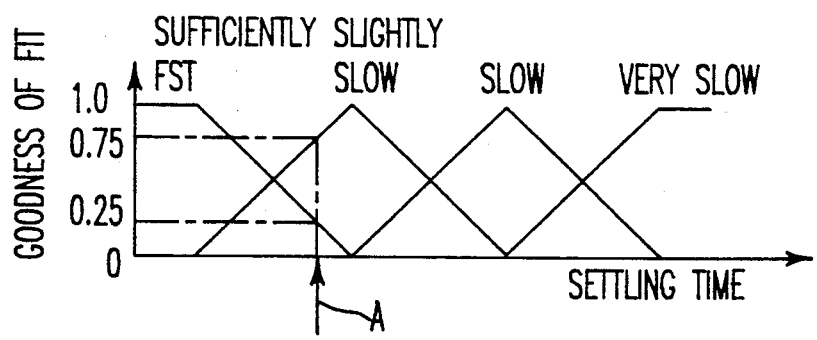
FIGS. 2A to 2D are conceptual diagrams illustrating membership functions corresponding to Group 1 of Rules.
Figure 2B:
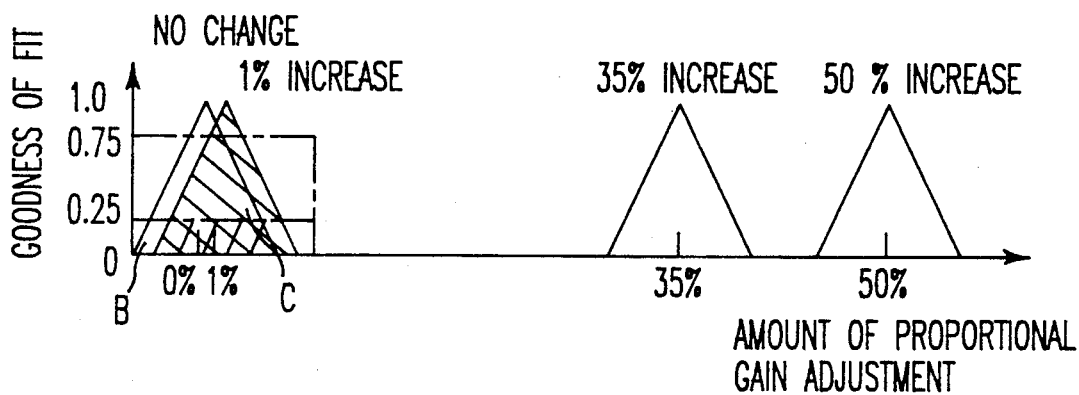
Figure 2C:
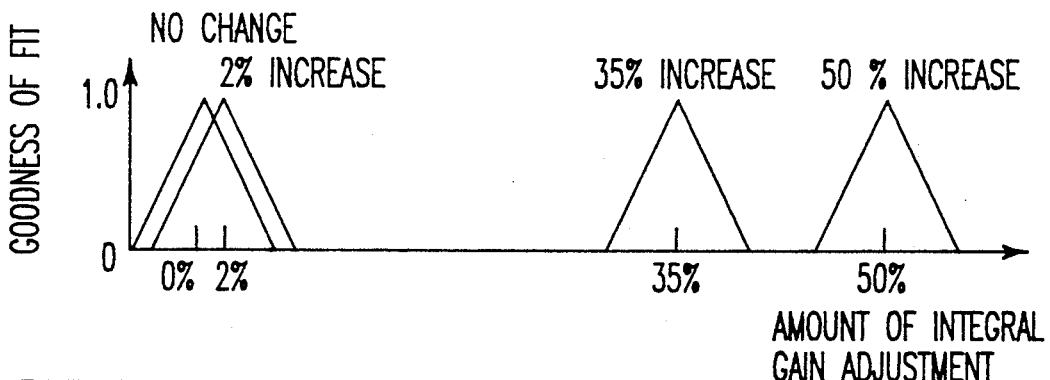
Figure 2D:
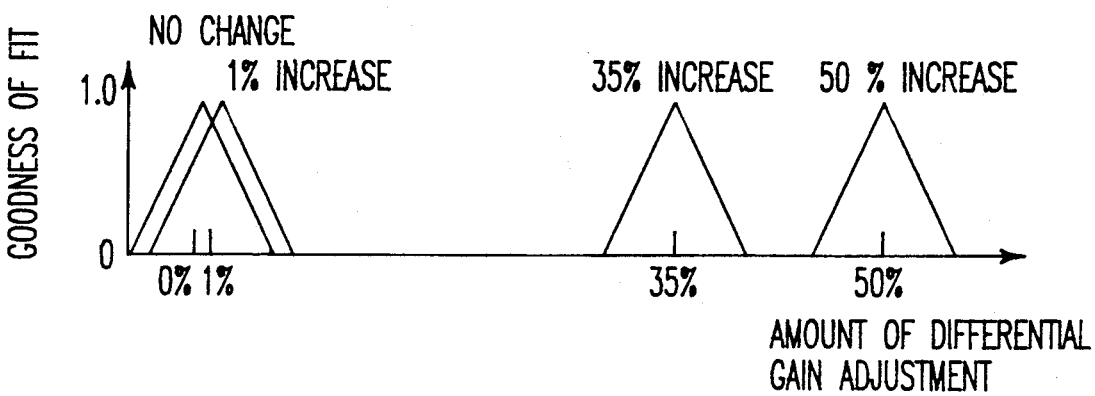
Figure 6:
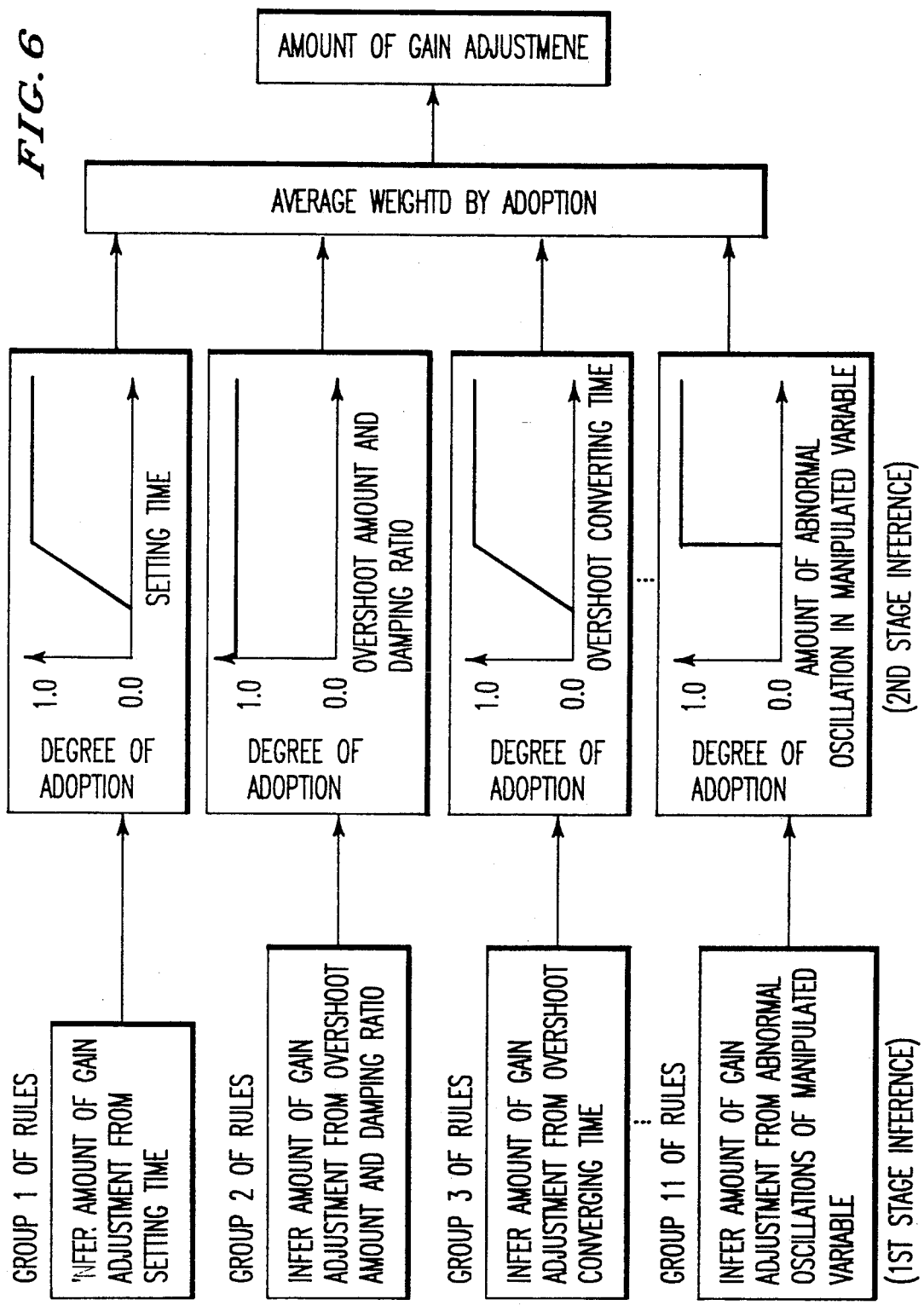
FIG. 6 is a conceptual diagram illustrating processing after the amounts of gain adjustment are inferred for the respective groups of rules.

The aforementioned 11 groups of rules include membership functions from which amounts of gain adjustment are inferred for the respective groups of rules by determining the goodness of fit concerning each rule of the groups of rules, and the storage means 22 store these membership functions. By way of illustration, FIGS. 2A to 2D show membership functions for expressing Group 1 of Rules. It should be noted that FIG. 2A shows membership functions of antecedents, while FIGS. 2B to 2D show membership functions of consequents, which correspond to the proportional gain, the integral gain, and the differential gain, respectively. In addition, the storage means 22 stores for each group of rules the relationship between the magnitude of each characteristic variable and the degree of adoption for adopting the results of inference of the amounts to be adjusted. As shown in FIG. 6, the degree of adoption in this embodiment can be changed in correspondence with a change in the characteristic variable, with the exception of the degree of adoption corresponding to Group 2 of Rules, and the aforementioned relationship is stored in the form of membership functions.

The amount of overshoot and the damping of oscillations, which are the characteristic variables in Group 2 of Rules, are characteristic variables concerning the stability of control. Since the degree of importance of these characteristic variables is high, these two characteristic variables are combined, and detailed rules such as those shown in Tables 1, 2, and 3 above are provided. In addition, with respect to the degree of adoption as well, the degree of adoption of Group 2 of Rules is made maximal, and adjustment is thus effected by placing emphasis on the stability of control.

The antecedent corrector 24 is connected to the storage means 22. In this embodiment, a rotational speed region in which the respective characteristic variable of the internal combustion engine 14 cannot be controlled within a permissible range is measured in advance. It should be noted that, in this embodiment, this rotational speed range is set to 1000 rpm or less. The antecedent corrector 24 receives as its input the rotational speed as the controlled variable, and determines on the basis of the rotational speed inputted thereto whether the internal combustion engine 14 is within that rotational speed range. If it is determined that the internal combustion engine 14 is within that rotational speed range, the relationship between the characteristic variables of the groups of rules and the amounts of gain adjustment is corrected in such a manner that a change in that rotational speed is allowed.

Figure 3:
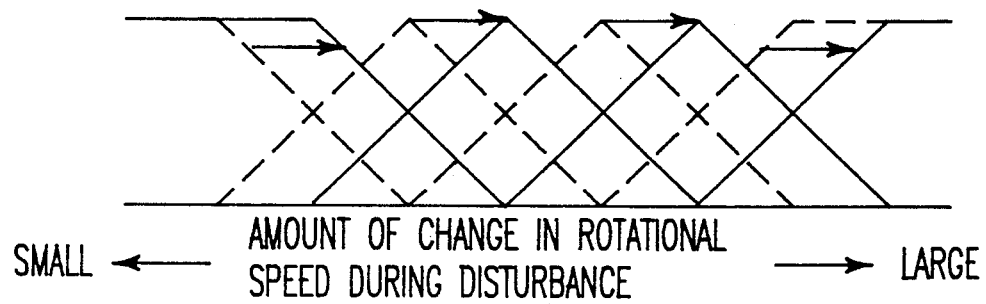
FIG. 3 is a conceptual diagram illustrating the correction by an antecedent corrector of membership functions of antecedents corresponding to the "amount of change in a controlled variable during a disturbance," "amount of overshoot," "overshoot converging time," and "time required for recovering a change in the controlled variable during a disturbance;"
Figure 4:
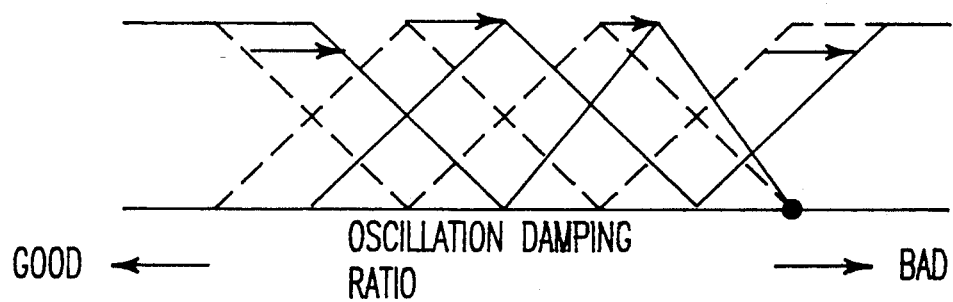
FIG. 4 is a conceptual diagram illustrating the correction by the antecedent corrector of membership functions of an antecedent corresponding to the "damping of oscillations;"

Specifically, as shown in FIG. 3, a correction is made in such a manner that the membership functions of antecedents for evaluating the "amount of change in rotational speed (controlled variable) during a disturbance" in Group 7 of Rules are shifted in a direction in which the triangles are made larger (in the rightward direction). As a result, the weight concerning the evaluation of being "good" increases with respect to the same amount of change in rotational speed, so that the scope of evaluation with respect to the amount of change in the rotational speed during a disturbance becomes broader. Corrections are similarly made with respect to the membership functions of antecedents for evaluating the "amount of overshoot," the "overshoot converging time," and the "time required for recovering a change in the controlled variable during a disturbance" in Group 2 of Rules, Group 3 of Rules, and Group 8 of Rules. In addition, with respect to membership functions of antecedents for evaluating the "damping of oscillations" in Group 2 of Rules, a correction is made as shown in FIG. 4. That is, with respect to a triangle corresponding to the evaluation of the membership function being "bad," a correction is made in such a manner that a lower right vertex of the triangle is fixed and the other two vertices are moved rightward by taking into consideration its relationship with the triangle corresponding to the evaluation of being "very bad." With respect to the triangles respectively corresponding to the evaluations of being "slightly bad" and "sufficiently good," corrections are made in such a manner that the overall triangles are shifted rightward.

Meanwhile, the fuzzy inference unit 20 performs a fuzzy inference by using the characteristic variables inputted from the characteristic variable detecting unit 18 as well as the rule base and the degree of adoption stored in the storage means 22, then determines amounts of gain adjustment for P, I, and D, respectively, and outputs the same to the PID arithmetic unit 12.

Figure 5:
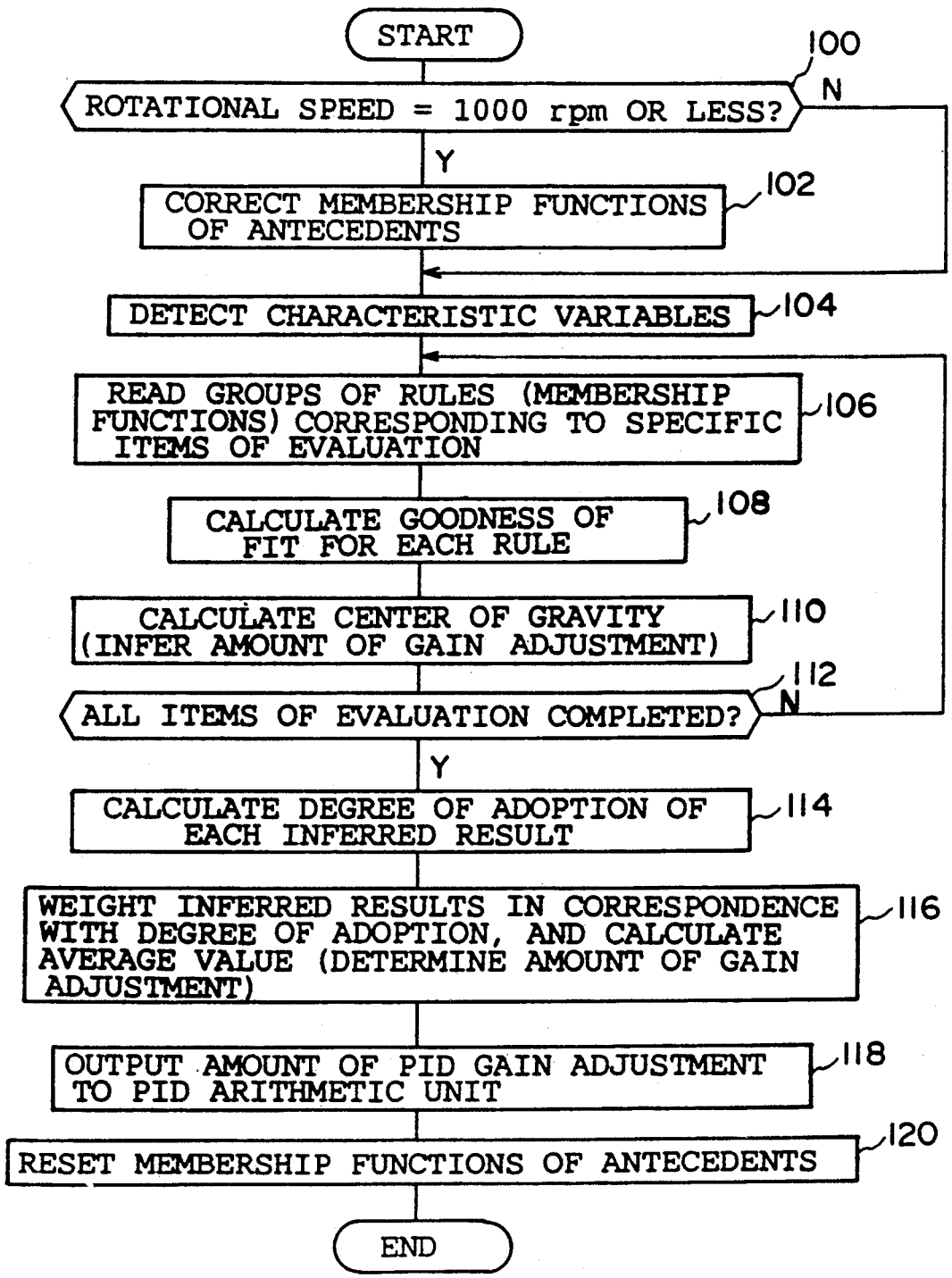
FIG. 5 is a flowchart illustrating the operation of the first embodiment.

Referring now to a flowchart shown in FIG. 5, a description will be given of the operation of the first embodiment. It should be noted that the flowchart shown in FIG. 5 is executed when the deviation reaches a predetermined value or more.

In Step 100, a determination is made as to whether or not the rotational speed of the internal combustion engine 14 is 1000 rpm or less. If YES is the answer in the determination in Step 100, the membership functions of antecedents in Groups 2, 3, 7, and 8 of Rules are corrected in Step 102 by the antecedent corrector 24 as shown in FIGS. 3 and 4, and the operation proceeds to Step 104. As a result, the scopes of evaluation with respect to the "damping of oscillations," the "amount of overshoot," the "overshoot converging time," the "amount of change in the controlled variable during a disturbance," and the "time required for recovering a change in the controlled variable during a disturbance" become broad. Hence, the aggravation of the characteristic variables due to the occurrence of a change in the rotational speed of the internal combustion engine 14 is allowed. If NO is given as the answer in the determination in Step 100, the operation proceeds to Step 104 without executing the processing in Step 102.

In Step 104, the aforementioned 12 characteristic variables are detected on the basis of various items of information inputted to the characteristic variable detecting unit 18. In an ensuing Step 102, a group of rules corresponding to a specific item of evaluation (e.g., Group 1 of Rules in the case of Item 1 of Evaluation) are read from the adjusting rule base stored in the storage means 22. At this time, with respect to Groups 2, 3, 7 and 8 of Rules, if the processing in Step 102 has been executed, the groups of rules for which the membership functions of antecedents have been corrected are read. In Step 108, the goodness of fit concerning each of the rules with respect to the characteristic variables is calculated by using the characteristic variable concerning the item of evaluation (e.g., a deviation of a settling time from a set point in the case of Item 1 of Evaluation) and the membership functions of antecedents corresponding to the group of rules read.

For example, in a case where the value of the characteristic variable "the deviation of a settling time from a set point" is a value indicated by arrow A in FIG. A, calculations are made such that the goodness of fit concerning the "settling time is sufficiently fast" in the first rule is 0.25, and the goodness of fit concerning the "settling time is slightly slow" in the second rule is 0.

In an ensuing Step 110, in the membership functions of consequents, graphic forms, in which apex portions of the triangles corresponding to the amounts of gain adjustment indicated by the rules are cut off by the goodness of fit concerning the respective rules, are obtained for each rule. The plurality of graphic forms thus obtained are superposed one on top of another, and the center of gravity is determined. For example, referring to FIG. 2B, a description will be given of an amount of proportional gain to be adjusted in a case where the goodness of fit concerning the first rule is 0.25 and the goodness of fit concerning the second rule is 0.75. As for the first rule, since "no gain adjustment is effected" as the amount of gain adjustment indicated by the first rule, a graphic form B is obtained in which the apex portion of the graphic form corresponding to "no change" is cut off by the goodness of fit, 0.25, concerning the first rule. As for the second rule, since "the proportional gain is increased by 1%" as the amount of gain adjustment indicated by the second rule, a graphic form C is obtained in which the apex portion of the graphic form corresponding to "1% increase" is cut off by the goodness of fit, 0.75, concerning the second rule. Then, the center of gravity of the graphic forms B and C superposed one on top of the other is determined. This center of gravity corresponds to an average value in which amounts of gain adjustment indicated by the respective rules are weighted by the goodness of fit of the rules. That is, this center of gravity is the result of inferring the amount of proportional gain adjustment in Group 1 of Rules. If the above-described processing is effected in a similar manner with respect to the amount of integral gain adjustment and the amount of differential gain adjustment, the amount of gain adjustment with respect to a single item (set) of evaluation is inferred.

In Step 112, a determination is made as to whether or not the inference processing has been completed with respect to all the items of evaluation. If NO is the answer in the determination in Step 112, the operation returns to Step 102, and Steps 102 to 112 are repeated until YES is given as the answer in the determination in Step 112. Thus, groups of rules corresponding to the items of evaluation for which the inference processing has not been completed are read, and processing is effected in a manner similar to the one described above. In this way, the amounts of gain adjustment are inferred with respect to all the items of evaluation. It should be noted that in a case where the rotational speed of the internal combustion engine 14 is in a rotational speed range in which it is impossible to control the respective characteristic variable within a permissible range, since the membership functions of the groups of rules have been corrected as described above, a portion of adjustment for controlling changes in rotational speed which are impossible to eliminate is not included in the aforementioned amounts of gain adjustment inferred. Thus, appropriate amounts of gain adjustment are inferred with respect to the respective items of evaluation.

In Step 114, the degree of adoption of the results of inference of the groups of rules is calculated by using the membership functions of the degree of adoption and characteristic variables which are stored in the storage means 22. The membership functions of the degree of adoption of the groups of rules excluding Group 2 of Rules are set in such a manner that the degree of adoption becomes high when the controlled state of the object 14 to be controlled does not satisfy the requirements of the items of evaluation. As a result, since large weight is imparted by the results of inference of the groups of rules corresponding to the items of evaluation which do not satisfy the requirements, it is impossible to effect appropriate gain adjustment in greater agreement with the human thinking. It should be noted that, with respect to Group 2 of Rules, since this group is closely related to the stability of control, the degree of adoption is set to "1.0" (maximum value) irrespective of the characteristic variables (the overshoot amount and the damping ratio) by taking the stability of control into consideration (see FIG. 6).

In Step 116, the results of inference for the respective groups of rules are weighted by using the degree of adoption calculated in the above-described manner, and average values are calculated. As a result, the respective results of inference are handled in parallel, and amounts of gain adjustment reflecting a multiplicity of characteristic variables are determined with respect to the proportional gain, the integral gain, and the differential gain, respectively. In Step 118, the amounts of PID gain adjustment determined in the above-described manner are inputted to and set in the PID arithmetic unit 12. It should be noted that since the groups of rules of the rule base are prepared by using the human knowhow, the aforementioned amounts of gain adjustment reflect the human knowhow. Accordingly, the respective gains are adjusted in such a manner that appropriate control in agreement with the human thinking will be effected.

In an ensuing Step 120, if the processing in Step 102 has been executed and the membership functions of the antecedents have been corrected, the membership functions are returned to their original state. As a result, when this routine is executed next, in a case where the rotational speed of the internal combustion engine 14 is greater than 1000 rpm, the amounts of gain adjustment are inferred by normal groups of rules. In the event that fluctuations in rotational speed have occurred, the amounts of gain adjustment are determined in such a manner as to eliminate the same.

Figure 7A:
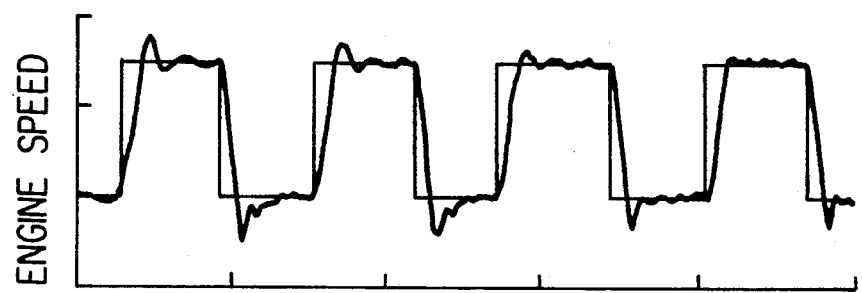
FIGS. 7A and 7B are waveform diagrams illustrating the process of auto-tuning in a case where a set point is changed when an internal combustion engine is under no load.
Figure 7B:
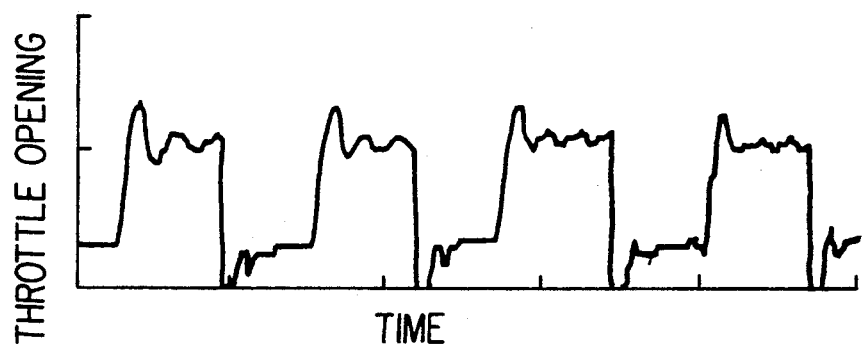
Figure 8A:
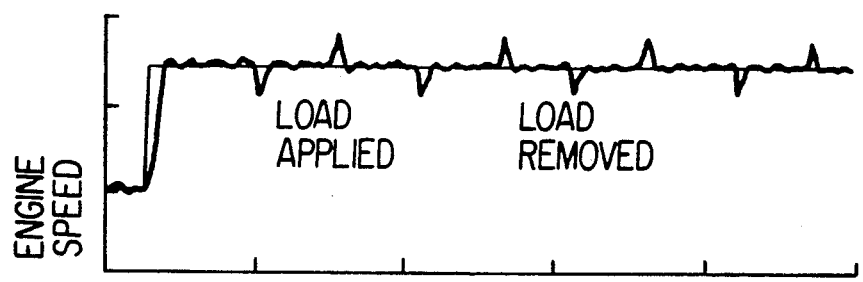
FIGS. 8A and 8B are waveform diagrams illustrating the process of auto-tuning in a case where a load to be applied to the internal combustion engine is changed by a hydraulic pump.
Figure 8B:
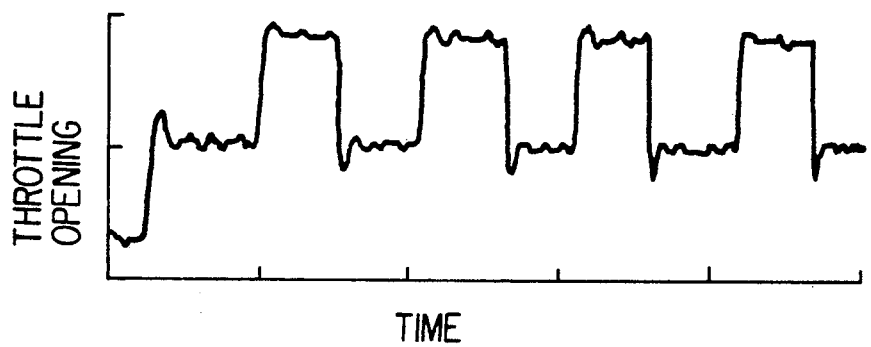
Figure 9A:
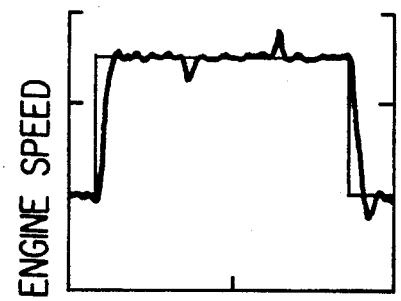
FIGS. 9A and 9B are waveform diagrams illustrating the response of the internal combustion engine after the end of tuning.
Figure 9B:
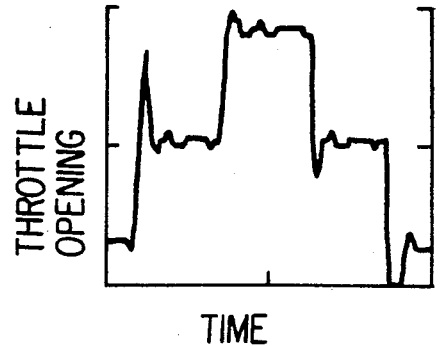

Next, a description will be given of the results of actually conducting the gain adjustment of the internal combustion engine 14 by means of the PID controller 10 with a gain adjusting device in accordance with the first embodiment. FIGS. 7A and 7B show the process of auto-tuning in a case where the set point is changed when the internal combustion engine 14 is under no load. These drawings show the manner in which fluctuations in the engine speed, which were characterized by relatively large oscillations, come to be dampened by auto-tuning. FIGS. 8A and 8B show the processing of auto-tuning in a case where the load applied to the internal combustion engine 14 is changed by a hydraulic pump. As shown in FIG. 8A, peaks in fluctuations of the engine speed during each moment when the load is applied and each moment when the load is removed become gradually smaller. Thus, by alternately effecting tuning due to a change in the set point and tuning due to a change in load, gain adjustment is effected in such a manner that the following of the set point and the control of a disturbance become compatible. The response after the completion of tuning is shown in FIGS. 9A and 9B.

As described above, in the first embodiment, the 12 characteristic variables are divided into 11 sets corresponding to the items of evaluation, groups of rules for expressing the relationship between the corresponding characteristic variables and the amounts of gain adjustment by using membership functions are set for each set so as to form a rule base, and the rules in the groups of rules excluding Group 2 of Rules are constituted by single propositions. Accordingly, it is possible to reduce the number of rules, and the gain adjusting device can be applied to an object to be controlled such as the internal combustion engine 14 for which a multiplicity of items of evaluation need to be set.

In addition, as described above, the membership functions of the degree of adoption of the groups of rules excluding Group 2 of Rules are set in such a manner that the degree of adoption becomes high when the controlled state of the object 14 to be controlled does not satisfy the requirements of the items of evaluation corresponding to the groups of rules. Hence, large weight is imparted by the results of inference of the groups of rules corresponding to the items of evaluation which do not satisfy the requirements, and it is possible to effect appropriate gain adjustment in greater agreement with the human thinking.

In addition, in the first embodiment, in the case where the rotational speed of the internal combustion engine 14 is 1000 rpm or less, the membership functions of the antecedents in the groups of rules are corrected in such a manner as to broaden the permissible range of each of the characteristic variables. Consequently, the gain is changed to control the changes in the engine speed, and the gain is set appropriately. Hence, it is possible to effect appropriate control with respect to an object to be controlled such as the internal combustion engine 14 for which a multiplicity of items of evaluation need to be set.

Figure 17:
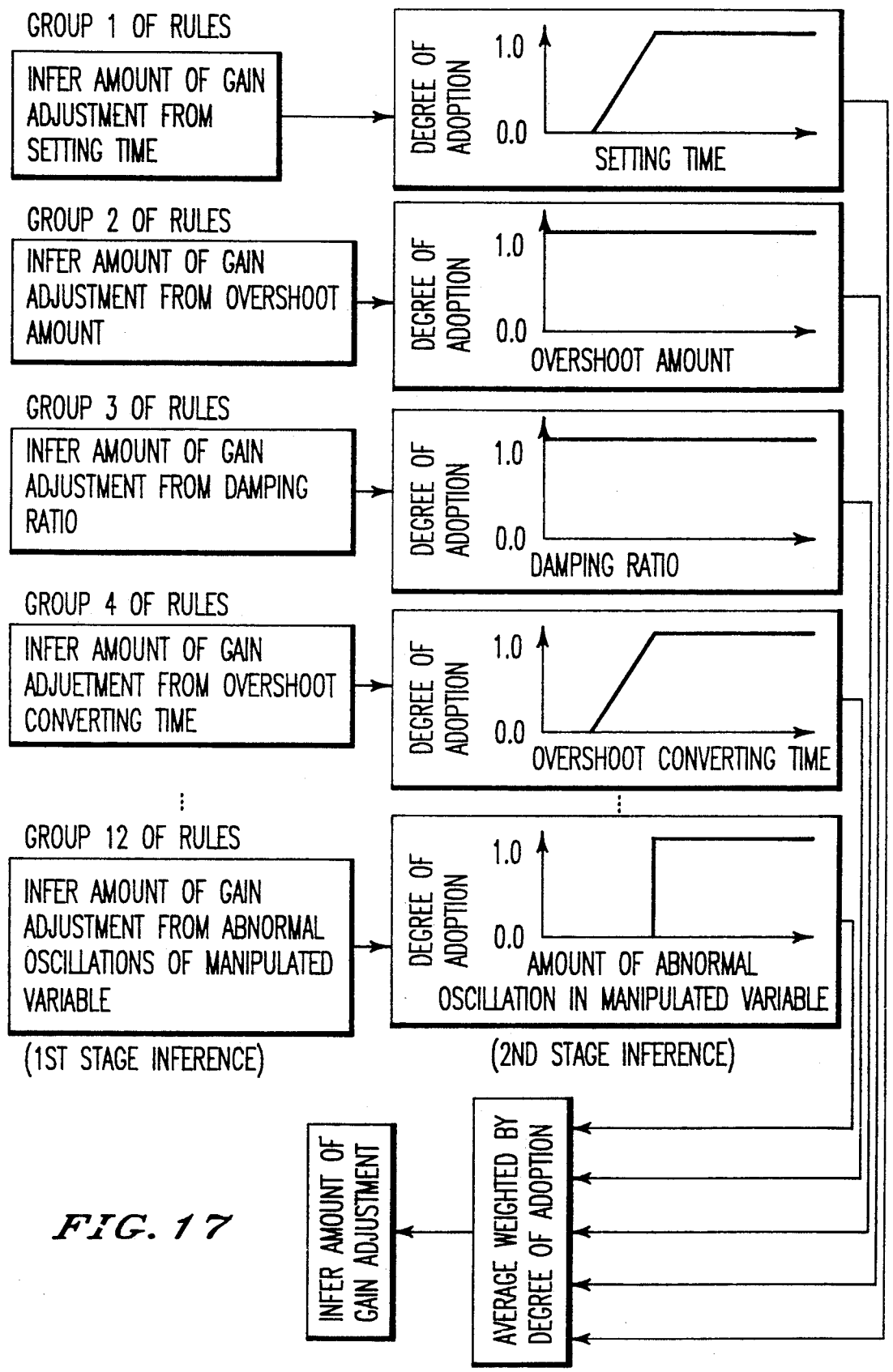
FIG. 17 is a conceptual diagram which is similar to FIG. 6 and in which a group of rules is further divided into two sets.

In this first embodiment, Group 2 of Rules is constituted by detailed rules by taking two characteristic variables into consideration as shown in Tables 1, 2, and 3 above. However, the invention is not restricted to the same, and Group 2 of Rules may be divided into two sets, and the number of sets may be made identical to the number of characteristic variables. A conceptual diagram similar to FIG. 6 in this case is shown in FIG. 17, and the groups of rules are shown below. In this case, there are cases where the converging time is prolonged by about 30% depending on the running conditions, but no problem is presented in practical use.

Item 2 of Evaluation: Whether the amount of overshoot is small.

Group 2 of Rules: Gain adjustment is effected in such a manner that the amount of overshoot becomes small. In addition, the degree of adoption of this group of rules is always set to 1.0.

If the amount of overshoot is sufficiently small,
then no gain adjustment is effected.
If the amount of overshoot is slightly large,
then the proportional gain is increased by 3%, and
the integral gain is decreased by 3%.
If the amount of overshoot is large,
then the proportional gain is increased by 16%, and
the integral gain is decreased by 6%.
If the amount of overshoot is very large,
then the proportional gain is increased by 30%, and
the integral gain is decreased by 12%.

Item 2 of Evaluation: Whether the damping of oscillations is good.

Group 2 of Rules: Gain adjustment is effected in such a manner that the damping of oscillations becomes good. In addition, the degree of adoption of this group of rules is always set to 1.0.

If the damping of oscillations is sufficiently good,
then no gain adjustment is effected.
If the damping of oscillations is slightly bad,
then the proportional gain is decreased by 3%,
the integral gain is decreased by 3%, and
the differential gain is increased by 4%.
If the damping of oscillations is bad,
then the proportional gain is decreased by 6%,
the integral gain is decreased by 6%, and
the differential gain is increased by 10%.
If the damping of oscillations is very bad,
then the proportional gain is decreased by 12%,
the integral gain is decreased by 12%, and
the differential gain is increased by 20%.

Next, a description will be given of a second embodiment of the present invention. This second embodiment has substantially the same configuration as that of the first embodiment, but differs in the following: After determining the amounts of gain adjustment in the same way as in the first embodiment, the fuzzy inference unit 20 calculates post-adjustment gains on the basis of those amounts of gain adjustment and the present gains, and sets the post-adjustment gains in the PID arithmetic unit 12. On the basis of the set gains and deviations inputted thereto, the PID arithmetic unit 12 determines the manipulated variable to be imparted to the internal combustion engine 14.

As described above, also in the case where the arrangement is provided such that the fuzzy inference unit 20 calculates gains and sets the same in the PID arithmetic unit 12, it is possible to obtain advantages in that it is possible to effect appropriate gain adjustment in greater agreement with the human thinking, and that the gain adjusting device can be applied to an object to be controlled such as the internal combustion engine 14 for which a multiplicity of items of evaluation need to be set. Thus, the gain adjusting device in accordance with the present invention is not restricted to one which sets amounts of gain adjustment in the PID controller, and may be one in which the gains are calculated and set as described above.

Next, a description will be given of a third embodiment of the present invention. It should be noted that components or portions identical with those of the preceding embodiments will be denoted by the same reference numerals, and a description thereof will be omitted.

Figure 10:
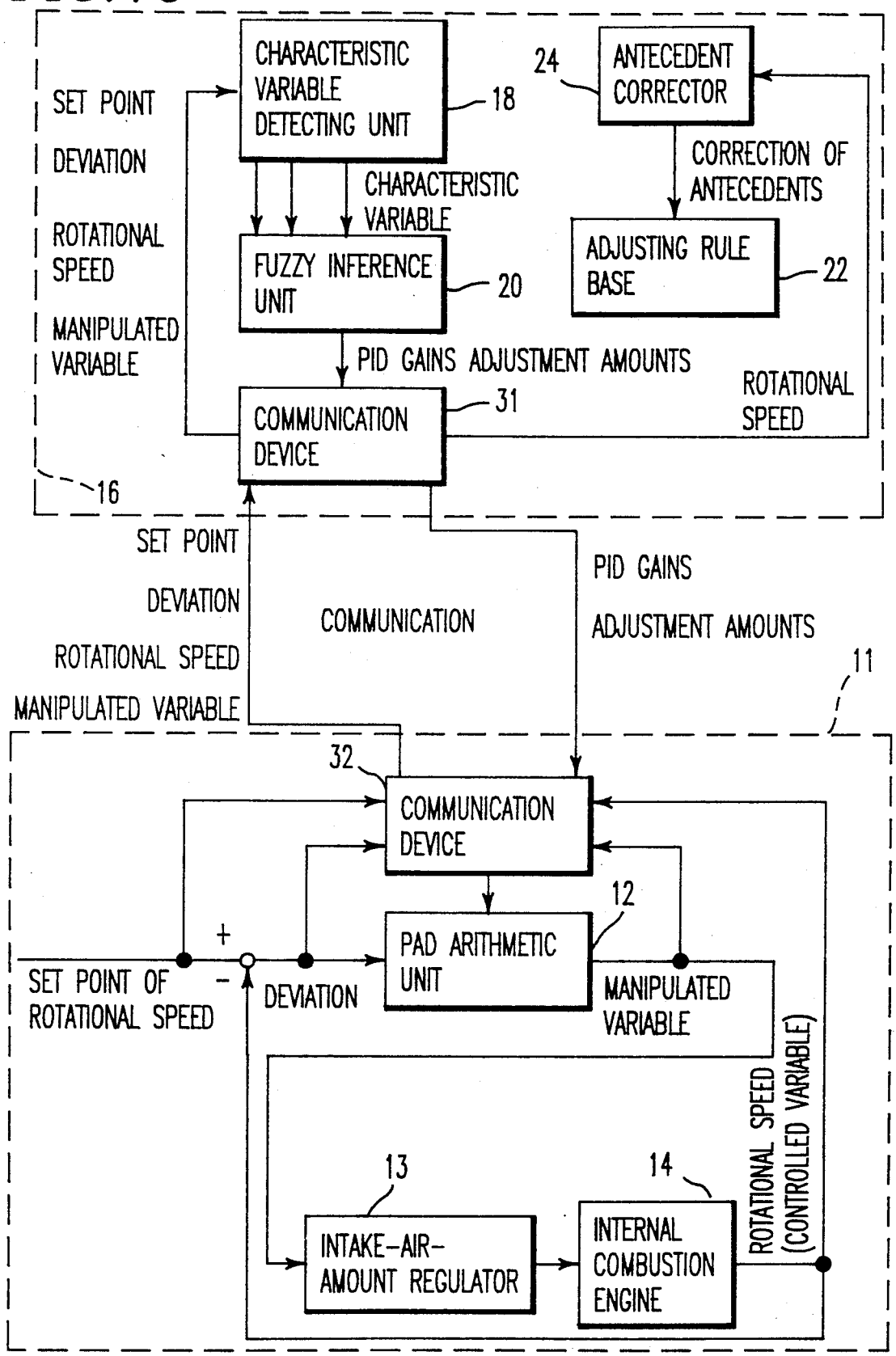
FIG. 10 is a schematic diagram of a PID controller with a gain adjusting device including an auto-tuning section in accordance with a third embodiment.

As shown in FIG. 10, the PID controller with a gain adjusting device in accordance with the third embodiment is separated into a PID control section 11 having the PID arithmetic unit 12 and the auto-tuning unit 16 having the characteristic variable detecting unit 18, the fuzzy inference unit 20, and the storage means 22. The PID control section 11 has a communication device 32. Inputted to the communication device 32 are the manipulated variable imparted to the internal combustion engine 14, the rotational speed of the internal combustion engine 14, the set point of the rotational speed, and the deviation of the set point of the rotational speed from the rotational speed. The communication device 32 transmits the information inputted thereto to a communication device 31 of the auto-tuning section 16.

The communication device 31 is connected to the characteristic variable detecting unit 18, and supplies the information which it has received to the characteristic variable detecting unit 18. On the basis of the information supplied thereto, the characteristic variable detecting unit 18 detects the characteristic variables in the same way as the first embodiment. Also, the communication device 31 is connected to the fuzzy inference unit 20, and the amounts of P, I, and D gain adjustment determined by the fuzzy inference unit 20 are inputted to the communication device 31. The communication device 31 transmits the amounts of P, I, and D gain adjustment which it has received to the communication device 32. The communication device 32, in turn, sets in the PID arithmetic unit 12 the amounts of P, I, and D gain adjustment which it has received. The PID arithmetic unit 12 adjusts the gains for P, I, and D in correspondence with the amounts of gain adjustment thus set, and imparts a predetermined manipulated variable to the internal combustion engine 14.

Even if the arrangement is provided such that the auto-tuning section 16 sets the amounts of gain adjustment in the PID control section 11 via the communication means or the like as described above, it is possible to obtain the advantages that, in the same way as in the first embodiment, it is possible to effect appropriate gain adjustment in greater agreement with the human thinking, and that the gain adjusting device can be applied to an object to be controlled such as the internal combustion engine 14 for which a multiplicity of items of evaluation need to be set. Thus, in the present invention, there is no need for the gain adjusting device and the PID controller to be directly connected to each other, and they may be connected to each other via transmitting means such as communication devices.

Next, a description will be given of a fourth embodiment of the present invention. This fourth embodiment has substantially the same configuration as that of the third embodiment, but differs in the following: After determining the amounts of gain adjustment in the same way as in the first embodiment, the fuzzy inference unit 20 calculates post-adjustment gains on the basis of those amounts of gain adjustment and the present gains, and outputs the post-adjustment gains to the communication device 31. The outputted gains are set in the PID arithmetic unit 12 via the communication devices 31, 32. On the basis of the set gains and deviations inputted thereto, the PID arithmetic unit 12 determines the manipulated variable.

Even if the arrangement is provided such that the gains are calculated in the fuzzy inference unit 20, and the gains are set in the PID arithmetic unit 12 via the transmitting means such as the communication devices as described above, it is possible to obtain the advantages that, in the same way as in the first embodiment, it is possible to effect appropriate gain adjustment in greater agreement with the human thinking, and that the gain adjusting device can be applied to an object to be controlled such as the internal combustion engine 14 for which a multiplicity of items of evaluation need to be set.

In the above-described embodiments, a rotational speed range in which each of the characteristic variables cannot be controlled within a permissible range is determined in advance, and when the rotational speed of the internal combustion engine 14 has fallen within that rotational speed range, the membership functions of the antecedents are corrected by the antecedent corrector 24. However, an arrangement may be alternatively provided such that a comparison is made between a controlled variable concerning the supply of fuel and the rotational speed of the internal combustion engine 14, and when the rotational speed is changing by more than a permissible amount although the manipulated variable concerning the supply of fuel has not been changed, the membership functions of the antecedents are corrected as described above, thereby to allow changes in rotational speed.

In addition, although in the above-described embodiments the membership functions of the antecedents are corrected in the rotational speed range where each of the characteristic variables cannot be controlled within a permissible range, an arrangement may be alternatively provided such that, without correcting the membership functions of the antecedents, the membership functions of the consequents are corrected in such a way that the amounts of gain adjustment with respect to the results of evaluation of the membership functions of the antecedents become small.

Figure 11A:
FIGS. 11A and 11B are waveform diagrams illustrating the process of auto-tuning in a case where the basic principle of the present invention is applied to gain adjustment of a second-order delay system in an analog computer.
Figure 11B:
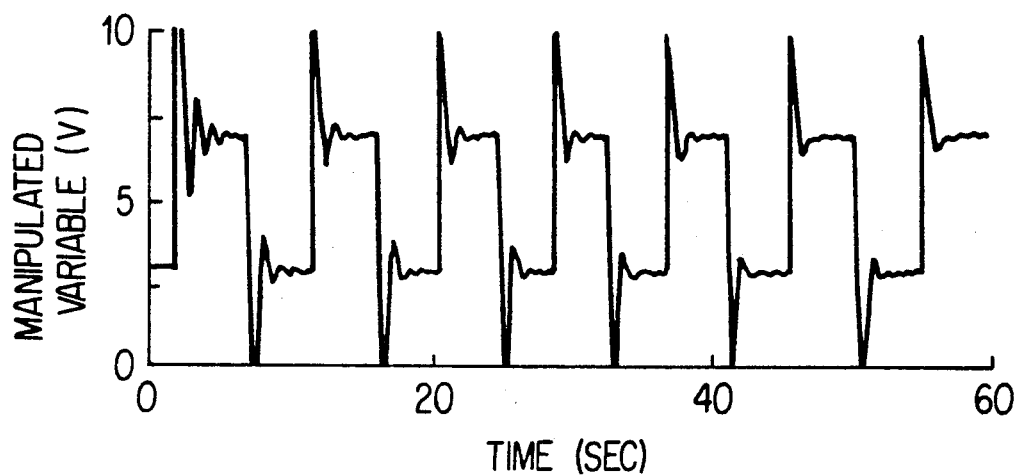
Figure 12A:
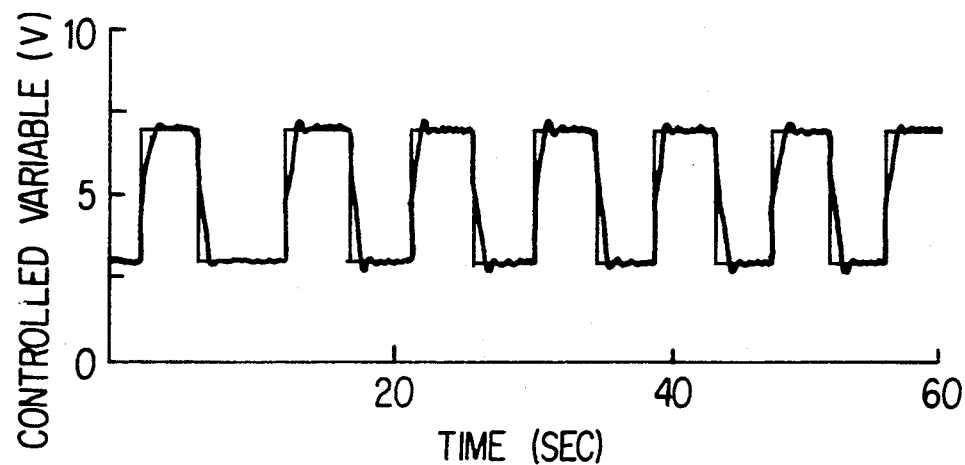
FIGS. 12A and 12B are waveform diagrams illustrating the process of gain readjustment process in a case where the basic principle of the present invention is applied to gain adjustment of the second-order delay system in the analog computer, and the response characteristics of an object to be controlled have changed from those of a fast system to those of a slow system.
Figure 12B:
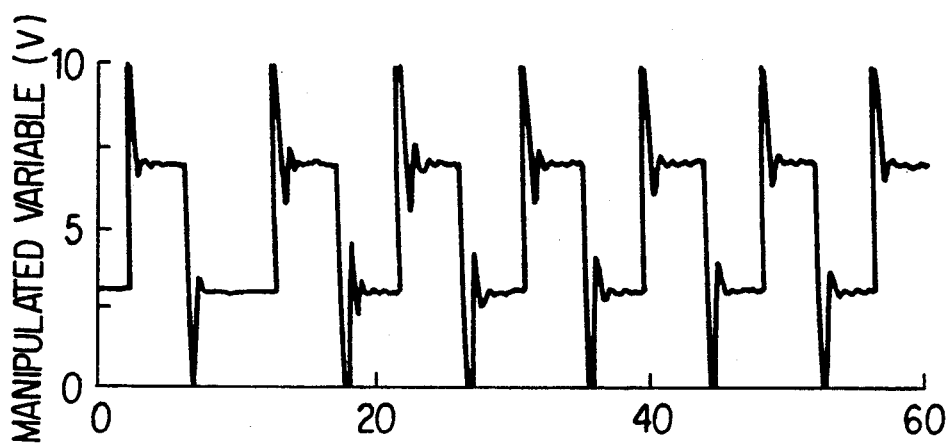
Figure 13A:
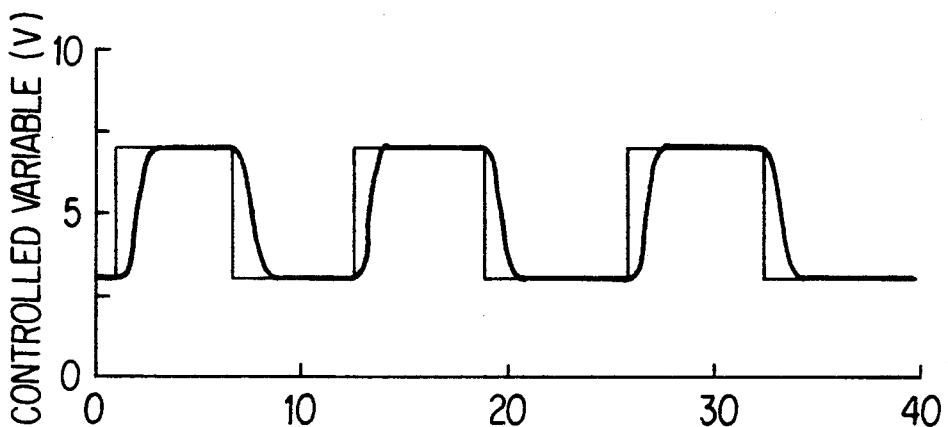
FIGS. 13A and 13B are waveform diagrams illustrating the process of auto-tuning in a case where the basic principle of the present invention is applied to gain adjustment of a fourth-order delay system of the analog computer.
Figure 13B:
Figure 14A:
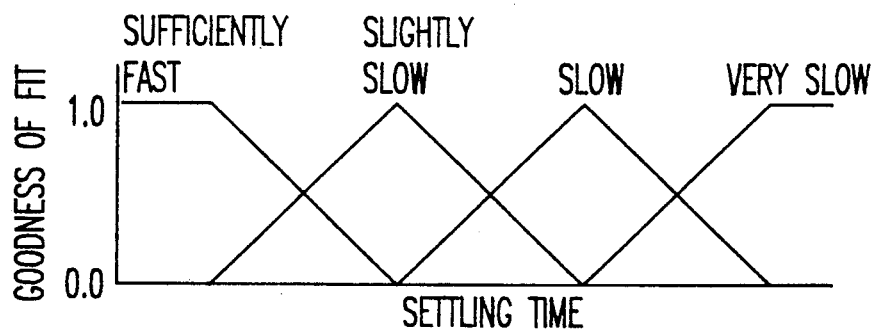
FIGS. 14A to 14D are conceptual diagrams illustrating the membership functions of antecedents in a conventional PID controller in which fuzzy inference is adopted.
Figure 14B:
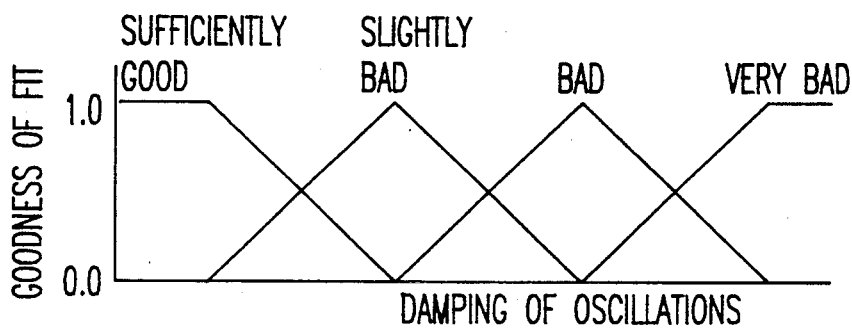
Figure 14C:
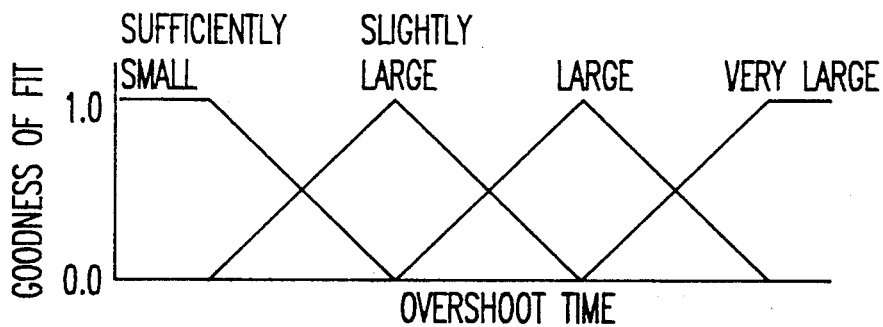
Figure 14D:
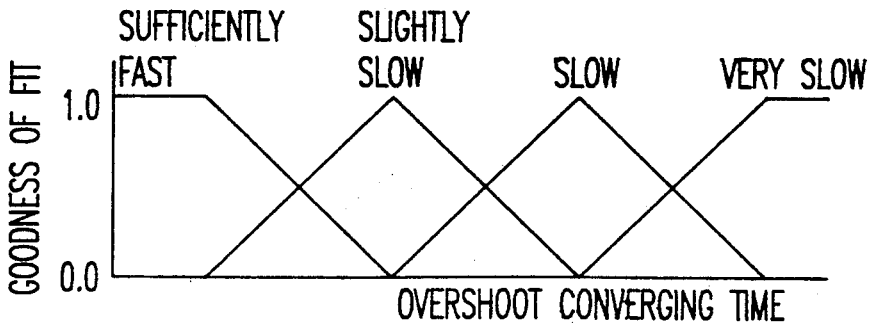
Figure 15A:
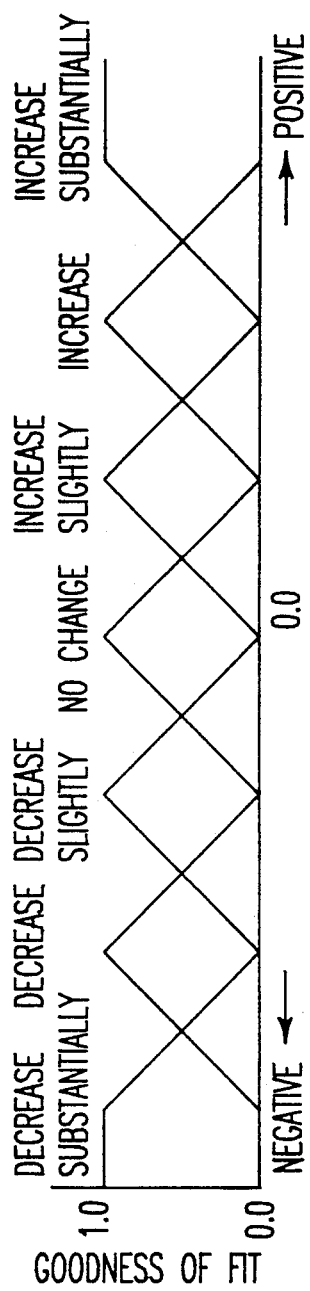
FIGS. 15A to 15C are conceptual diagrams illustrating the membership functions of consequents in the conventional PID controller in which fuzzy inference is adopted.
Figure 15B:
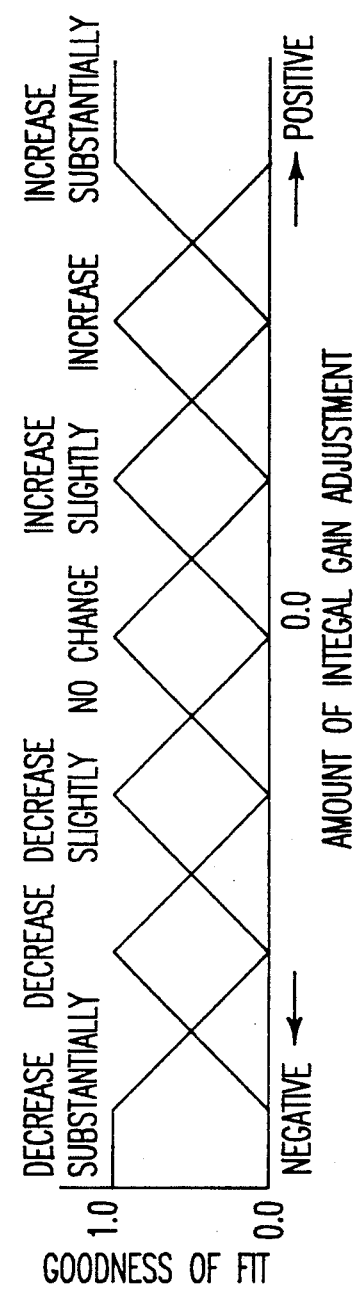
Figure 15C:
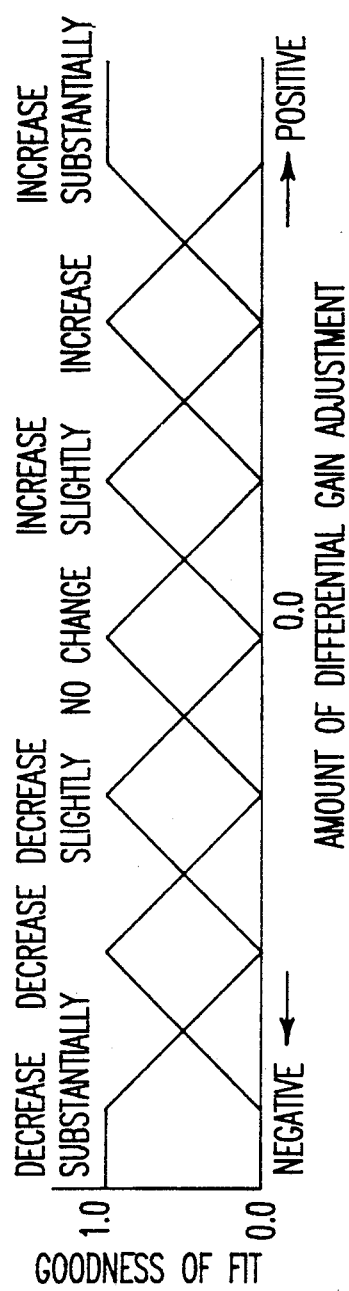

Furthermore, although in the above-described embodiments an example has been given in which the object to be controlled is the internal combustion engine 14, appropriate control can also be effected in a case where the basic principle of the present invention is applied to an object to be controlled for which a multiplicity of items of evaluation need to be set. As an example, a description will be given of the results of a case where the basic principle of the present invention is applied to the gain adjustment of an analog computer. FIGS. 11A and 11B show the process of auto-tuning through gain adjustment in a case where the object 14 to be controlled is a second-order delay system of the analog computer, in which each time the set point is changed, the waveform recognition is conducted to effect gain adjustment. These drawings show the manner in which fluctuations in the controlled variable, which were characterized by relatively large oscillations, come to be dampened by auto-tuning. FIGS. 12A and 12B show the process of gain readjustment process in a case where the object 14 to be controlled is the second-order delay system of the analog computer, and the response characteristics of the object to be controlled have changed from those of a fast system to those of a slow system. These drawings show that although oscillations occurred in the response of the controlled variable due to a change in the characteristics, the response waveform is controlled to a satisfactory one by auto-tuning without causing a decline in the response speed. FIGS. 13A and 13B show the process of auto-tuning in a case where a fourth-order delay system of the analog computer is used as the object to be controlled. It can be appreciated from the drawings that even if the order of the object to be controlled changes, auto-tuning through gain adjustment is possible. Thus, the present invention is highly versatile and is applicable to control of various objects to be controlled.

In addition, although in the above-described embodiments triangular membership functions are used, hanging bell-type membership functions may be used.

What is claimed is:

1. A gain adjusting device for a PID controller for controlling the rotational speed of an internal combustion engine, so as to adjust a gain of the PID controller in such a manner that the rotational speed agrees with a set point on the basis of a deviation of the rotational speed from a set point and a gain, comprising:

characteristic variable detecting means for detecting a plurality of characteristic variables concerning the rotational speed used for inference;

first storage means which stores groups of rules each indicating the relationship between the characteristic variable corresponding to a respective one of a plurality of sets which are divided from the plurality of characteristic variables and an amount of gain adjustment;

second storage means which stores the relationship between a magnitude of the characteristic variable corresponding to each of the sets and a degree of adoption of the amount of gain adjustment;

correcting means for correcting the relationship between each of the characteristic variables of the groups of rules and the amount of gain adjustment in such a manner that a permissible range is broadened when it is determined that each of the characteristic variables cannot be controlled within the permissible range; and inferring means for inferring the amount of gain adjustment for each of the sets on the basis of the characteristic variables detected and the groups of rules, for determining the degree of adoption of the amount of gain adjustment for each of the sets in correspondence of the manipulated variable of the respective characteristic variables, and for determining on the basis of the result of inference of the amount of gain adjustment and the degree of adoption an amount of gain to be adjusted by calculating a weighted average value of the result of inference of the amount of gain adjustment with the degree of adoption set as weight.

2. A gain adjusting device for a PID controller according to claim 1, wherein the inferring means sets the amount of gain to be adjusted in the PID controller.

3. A gain adjusting device for a PID controller according to claim 1, wherein the inferring means determines a post-adjustment gain on the basis of the amount of gain to be adjusted and a present gain, and sets the determined gain in the PID controller.

4. A gain adjusting device for a PID controller according to claim 1, wherein the inferring means sets the amount of gain to be adjusted in the PID controller by transmitting the amount of gain to be adjusted to the PID controller via communication means.

5. A gain adjusting device for a PID controller according to claim 1, wherein the inferring means determines a post adjustment gain on the basis of the amount of gain to be adjusted and a present gain, and sets the determined gain in the PID controller by transmitting the determined gain to the PID controller via communication means.

6. A gain adjusting device for a PID controller according to claim 1, wherein the plurality of characteristic variables are divided in such a manner as to correspond to a plurality of predetermined items of evaluation, respectively.

7. A gain adjusting device for a PID controller according to claim 1, wherein the plurality of characteristic variables are divided in such a manner as to correspond to a plurality of predetermined items of evaluation, respectively, and the relationship between the magnitude of each of the characteristic variables and the degree of adoption is determined in such a manner that, when requirements of a specific item of evaluation are not satisfied, the degree of adoption of the set corresponding to that item of evaluation becomes high.

8. A gain adjusting device for a PID controller according to claim 1, wherein the sets are divided in such a manner that the number of the sets equals the number of the characteristic variables.

9. A gain adjusting device for a PID controller according to claim 1, wherein the case in which each of the characteristic variables cannot be controlled within the permissible range is a case in which the rotational speed of the internal combustion engine is in a low rotational speed range.

10. A gain adjusting device for a PID controller according to claim 1, wherein the case in which each of the characteristic variables cannot be controlled within the permissible range is a case in which the rotational speed changes by more than a permissible value although a controlled variable concerning the supply of fuel has not been changed.

11. A gain adjusting device for a PID controller according to claim 1, wherein the characteristic variables related to the stability of rotational speed, among the plurality of characteristic variables, are combined to form a set.

12. A gain adjusting device for a PID controller according to claim 1, wherein the degree of adoption of the characteristic variables concerning stability among the plurality of characteristic variables is made maximal.

13. A gain adjusting device for a PID controller according to claim 12, wherein the sets are divided in such a manner that the number of the sets equals the number of the characteristic variables.

* * * * *